United States Patent
Chen et al.

(10) Patent No.: US 8,447,123 B2
(45) Date of Patent: May 21, 2013

(54) METHOD AND APPARATUS FOR SELECTING A SCAN PATH FOR THE ELEMENTS OF A BLOCK IN SPATIAL DOMAIN PICTURE ENCODING AND DECODING

(75) Inventors: Qu Qing Chen, Beijing (CN); Zhi Bo Chen, Beijing (CN); Xiao Dong Gu, Beijing (CN)

(73) Assignee: Thomson Licensing (FR)

( * ) Notice: Subject to any disclaimer, the term of this patent is extended or adjusted under 35 U.S.C. 154(b) by 804 days.

(21) Appl. No.: 12/450,869

(22) PCT Filed: Apr. 20, 2007

(86) PCT No.: PCT/CN2007/001297
§ 371 (c)(1),
(2), (4) Date: Oct. 16, 2009

(87) PCT Pub. No.: WO2008/128380
PCT Pub. Date: Oct. 30, 2008

(65) Prior Publication Data
US 2010/0040298 A1   Feb. 18, 2010

(51) Int. Cl.
*G06K 9/36* (2006.01)
(52) U.S. Cl.
USPC ........... 382/232; 382/233; 382/236; 382/238; 382/245; 382/168; 375/204.16; 375/240.01; 375/240.12; 375/240.14
(58) Field of Classification Search
USPC .............. 382/168, 248, 250, 251, 245, 238, 382/236; 375/240.16, 240.01, 240.12, 240.13, 375/240.14
See application file for complete search history.

(56) References Cited

U.S. PATENT DOCUMENTS

| 5,654,706 | A |  | 8/1997 | Jeong | |
|---|---|---|---|---|---|
| 5,767,909 | A | * | 6/1998 | Jung | 375/240.18 |
| 5,790,706 | A | * | 8/1998 | Auyeung | 382/248 |
| 5,990,960 | A | * | 11/1999 | Murakami et al. | 375/240.12 |
| 7,215,707 | B2 | * | 5/2007 | Lee et al. | 375/240.18 |
| 7,379,608 | B2 | * | 5/2008 | Marpe et al. | 382/247 |
| 7,586,924 | B2 | * | 9/2009 | Wiegand | 370/395.64 |

(Continued)

FOREIGN PATENT DOCUMENTS

| GB | 2309613 | | 7/1997 |
|---|---|---|---|
| GB | 2309613 | A * | 7/1997 |

(Continued)

OTHER PUBLICATIONS

Copy of Search Report Dated Nov. 20, 2007.

(Continued)

*Primary Examiner* — Mekonen Bekele
(74) *Attorney, Agent, or Firm* — Jack Schwartz and Associates, PLLC

(57) ABSTRACT

International image or video coding standards uses hybrid coding, wherein a picture is separated into pixel blocks on which predictive coding, transform coding and entropy coding is employed. The transform coding is effective because the prediction error samples are correlated in the frequency domain. However, when the prediction quality is getting better and better, spatial domain coding becomes more effective than transform coding. According to the invention, it is first determined in which corner of a current block the first non-zero amplitude value is located. Based on the related zeros run length value in that block, a pre-defined scan path is selected, i.e. a context-based adaptive scan mode is used.

15 Claims, 3 Drawing Sheets

U.S. PATENT DOCUMENTS

Figure 1:
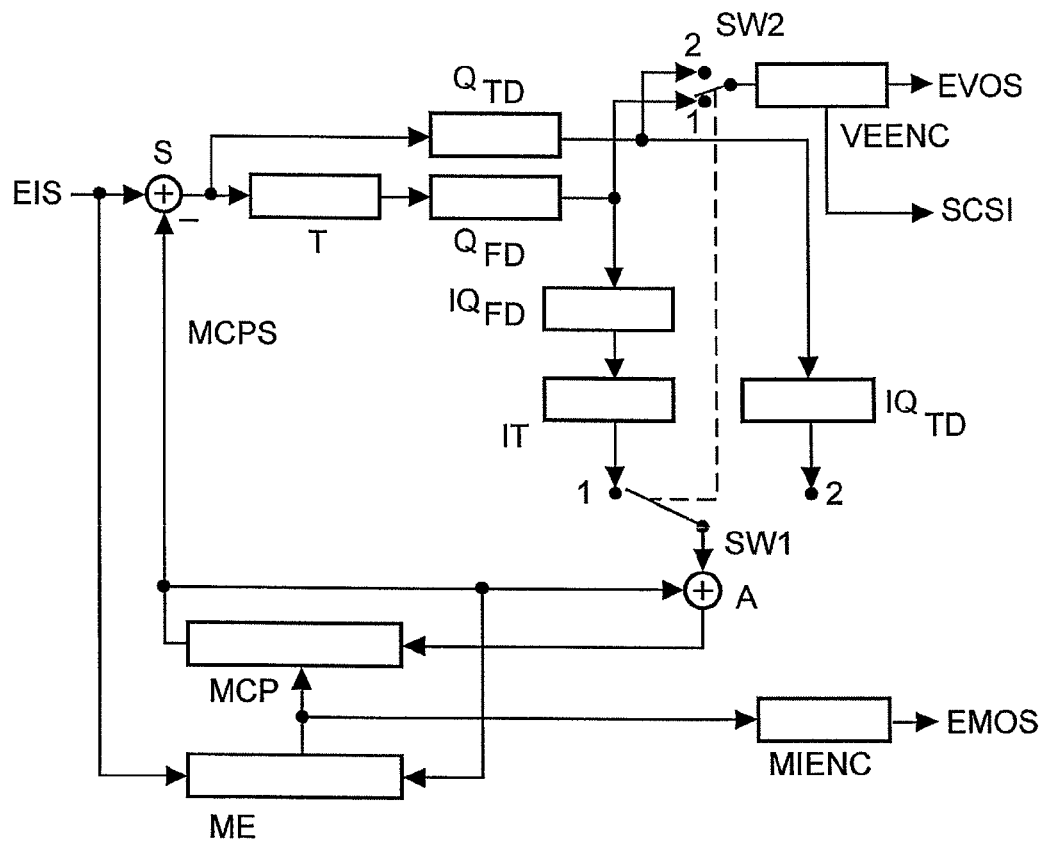

| | | | | |
|---|---|---|---|---|
| 7,599,435 | B2* | 10/2009 | Marpe et al. | 375/240.16 |
| 8,009,069 | B2* | 8/2011 | Chen et al. | 341/67 |
| 8,179,981 | B2* | 5/2012 | Chen et al. | 375/240.27 |
| 2010/0183069 | A1* | 7/2010 | Chen et al. | 375/240.03 |
| 2010/0194610 | A1* | 8/2010 | Chen et al. | 341/59 |

FOREIGN PATENT DOCUMENTS

| | | |
|---|---|---|
| JP | 6125278 | 5/1994 |
| JP | 9275559 | 10/1997 |
| JP | 10229340 | 8/1998 |
| JP | 2000138939 | 5/2000 |
| JP | 2000278680 | 10/2000 |
| WO | WO 98/00807 | 1/1998 |

OTHER PUBLICATIONS

Narroschke, Matthias, "Adaptive Prediction Error Coding in the Spatial and Frequency Domain in the KTA Reference Model", ISO/IEC JTC1/SC29/WG11, MPEG Video Subgroup, Montreux, Switzerland, Apr. 3, 2006.

Wu, Chin Hsiung et al., "Run-Length Chain Coding and Shape's Moment Computations on Arrays with Reconfigurable Optical Buses", IEEE International Conference on Parallel Processing, Piscataway, NJ, USA, Sep. 3, 2001, pp. 479-486.

Narroschke, Matthias et. al., "Adaptive Prediction Error Coding in Spatial and Frequency Domain with a Fixed Scan in the Spatial Domain", ITU—Telecommunications Standardization Sector—Video Coding Experts Group, 30th Meeting, Hangzhou, China, Oct. 23, 2007.

Narroschke, Matthias et. al., "Adaptive Prediction Error Coding in Spatial and Frequency Domain for H.264/AVC", ITU—Telecommunications Standardization Sector—Video Coding Experts Group, 29th Meeting, Bangkok, Thailand, Jan. 16, 2006.

* cited by examiner

Gradients

| 0 | 0 | 0 | 0 |
|---|---|---|---|
| 0 | 0 | 0 | 0 |
| -1 | 5 | 15 | 18 |
| -2 | -2 | 5 | 20 |

Samples

| 0 | 0 | 0 | 0 |
|---|---|---|---|
| 0 | 0 | 0 | 0 |
| 0 | -1 | 0 | 1 |
| 0 | 0 | 0 | 3 |

→ 3,1,0,-1,0,0,0,0,0,0,0,0,0,0,0,0

Fig. 3

| -4 | 2 | -4 | -41 |
|---|---|---|---|
| 4 | 2 | 1 | -14 |
| 3 | 0 | -1 | 7 |
| -4 | 3 | -5 | -7 |

| 0 | 0 | 0 | -2 |
|---|---|---|---|
| 0 | 0 | 0 | -1 |
| 0 | 0 | 0 | 0 |
| 0 | 0 | 0 | 0 |

Fig. 4

| -4 | -4 | -4 | 0 |
|---|---|---|---|
| -4 | -1 | -4 | 0 |
| 2 | -11 | -8 | -1 |
| 51 | 32 | 10 | 1 |

| 0 | 0 | 0 | 0 |
|---|---|---|---|
| 0 | 0 | 0 | 0 |
| 0 | -1 | 0 | 0 |
| 3 | 2 | 0 | 0 |

Fig. 5

Fig. 6
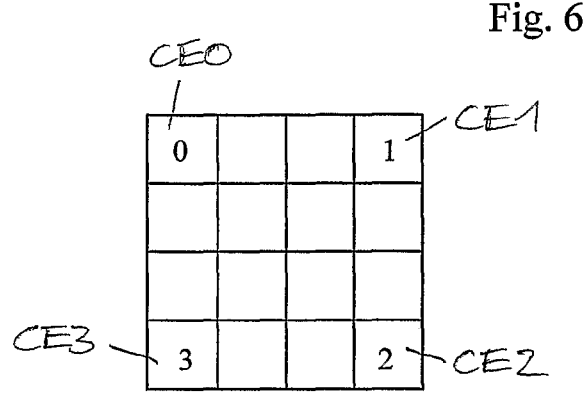
Fig. 7
| 0 | 9 | 10 | 1 |
|---|---|----|---|
| 8 | 4 | 5  | 11|
| 15| 7 | 6  | 12|
| 3 | 14| 13 | 2 |
Fig. 12
| 0 | 1 | 5 | 6 |
|---|---|---|---|
| 2 | 4 | 7 | 12|
| 3 | 8 | 11| 13|
| 9 | 10| 14| 15|
Fig. 8
| 0 | 9 | 3 | 1 |
|---|---|---|---|
| 13| 10| 6 | 2 |
| 14| 11| 7 | 4 |
| 15| 12| 8 | 5 |
Fig. 9
| 0 | 15| 14| 1 |
|---|---|---|---|
| 13| 12| 11| 9 |
| 10| 8 | 7 | 4 |
| 6 | 5 | 3 | 2 |
Fig. 10
| 0 | 13| 14| 1 |
|---|---|---|---|
| 8 | 9 | 12| 15|
| 4 | 7 | 10| 11|
| 3 | 5 | 6 | 2 |
Fig. 11

METHOD AND APPARATUS FOR SELECTING A SCAN PATH FOR THE ELEMENTS OF A BLOCK IN SPATIAL DOMAIN PICTURE ENCODING AND DECODING

This application claims the benefit, under 35 U.S.C. §365 of International Application PCT/CN2007/001297, filed Apr. 20, 2007, which was published in accordance with PCT Article 21(2) on Oct. 30, 2008 in English.

The invention relates to a method and to an apparatus for selecting a scan path for the elements of a block in spatial domain picture encoding and decoding.

BACKGROUND

International image or video coding standards like JPEG, MPEG-1/2/4 and H.261/H.263/H.264 use hybrid coding, wherein a picture is separated into pixel blocks on which predictive coding, transform coding and entropy coding is employed.

Normally, the transform coding is effective because the prediction error samples are correlated and in the transformed or frequency domain the signal energies become concentrated in partial areas of the coefficient blocks. Therefore any redundancy can be easily removed in the frequency domain. However, as disclosed in M. Narroschke, "Extending H.264/AVC by an adaptive coding of the prediction error", Proceedings of Picture Coding Symposium, April 2006 (PCS2006), when the prediction quality is getting better and better, transform coding is no longer effective in many cases because the prediction error sample values are correlated only marginally and the signal energies will not concentrate in the frequency domain. M. Narroschke proposes a spatial domain or time domain video coding in which the prediction error samples (also called 'residues') are directly quantised and entropy-coded, without a prior transform into the frequency domain. He further proposed to use a rate-distortion optimisation (RDO) strategy for selecting adaptively whether to use spatial domain residue coding or transform coding.

FIG. 3 shows a corresponding sample block of 'gradients', the resulting block of (quantised) samples, and a scanning path. Although additional side information is required to indicate which coding type is used for a current block, the overall coding performance gain is significant. It is reported that the Y_PSNR gain can be improved by 0.4 dB compared with the H.264/AVC High profile, especially for CIF/QCIF format, and by 0.2 dB for SD/HD video sequences. It is also reported that upon combination ⅛ pel motion compensation, there will be another 0.5 dB gain for CIF/QCIF resolution. This technology was also proposed to the VCEG standard workgroup as M. Narroschke, H. G. Musmann, "Adaptive prediction error coding in spatial and frequency domain for H.264/AVC", ITU-T, Question 6/SG16, document VCEG-AB06, Bangkok, Thailand, 16-20 Jan. 2006.

Encoding quantised samples in the time domain is also disclosed in H. Schiller, "Prediction signal controlled scans for improved motion compensated video coding", ELECTRONICS LETTERS, 4 Mar. 1993, Vol. 29, No. 5.

In the above publications, the scan of the quantised samples in the spatial domain is carried out according to the magnitude of the gradient in the prediction image, i.e. in the reconstructed reference frame, at the same spatial position.

M. Narroschke, H. G. Musmann, "Adaptive prediction error coding in spatial and frequency domain with a fixed scan in the spatial domain", ITU-T, Question 6/SG16, document VCEG-AD07, Hangzhou, China, October 2006, discloses a fixed scan in the spatial domain.

INVENTION

On one hand, the adaptive spatial domain scan is vulnerable to transmission errors. Because the scan order depends on the prediction image, if previous data are lost or corrupted, the resulting error will propagate to the current block to be decoded, and will be further diffused or enlarged in subsequent pictures or frames. This kind of error propagation is worse than other kinds of error propagation so that it is unacceptable in video coding.

On the other hand, the fixed scan disclosed in the Narroschke/Musmann article, which is in fact a line-by-line scan, does not depend on previous data and thus there is no error propagation problem. But such simple fixed scan in the spatial domain reduces to some extent the performance improvement over frequency domain processing.

An optimum scan path for entropy coding should statistically scan from the sample with the greatest absolute value via decreasing absolute value samples to the sample with the smallest absolute value, whereby more non-zero samples are clustered in the beginning of the scan path while more zeros are arranged in the tail of the scan path. This allows to reduce the number of coding bits required for encoding the zeros, and also benefits the context-based entropy encoding.

The best scan mode in the spatial domain varies from case to case. Line-by-line scan is one choice and column-by-column scan is another choice, and zigzag scan is a third choice. However, a specific one of these scan modes does not outperform the others from a picture statistics point of view.

A problem to be solved by the invention is to provide a scan processing that improves the coding efficiency but does not introduce an error propagation problem. This problem is solved by the methods disclosed in claims 1 and 3. Apparatuses that utilise these methods are disclosed in claims 2 and 4.

This invention is related to an improved scan processing for spatial domain residue image or video coding. A fixed scan path pattern is selected adaptively for each block, in order to obtain better entropy-encoding performance without reference to previous data so that error propagation is prevented. I.e., a context-based adaptive scan mode is used.

When for a specific original picture content spatial domain video coding is better than frequency domain video coding, in the spatial domain usually more non-zero quantised prediction error values (more quantised prediction error values having a greater absolute value) are distributed in the outer side (i.e. near the boundary) of a current block, and/or they are clustered in a corner of the current block. Based on such statistic properties of prediction error values in the spatial domain, the invention uses a first step of scanning and encoding the quantised prediction error in the corners of the current block, and uses a second step of selecting a suitable scan mode corresponding to the result of the first step for scanning and encoding the rest of the non-zero quantised prediction error values.

In general, within a given current block, the later scan path of the samples is based on an initially scanned and coded result. The cost of this context-based adaptive scanning is an increased complexity. However, a few most probable scan modes can be pre-calculated or pre-determined or pre-defined for selection, and this increased complexity is almost negligible when compared with other processing steps in video coding.

In principle, the inventive method is suited for selecting a scan path for the elements of a block in spatial domain picture encoding, said method including the steps:

determining in a current block, starting from a pre-defined corner element in said block, how many zero amplitude values of the corner elements said block contains when proceeding in clockwise direction, or as an alternative in counter-clockwise direction, and upon determining the first corner element having a non-zero amplitude, forming a run-level value pair wherein the 'run' value corresponds to the number of preceding zero-amplitude corner elements in said current block and the 'level' value corresponds to the amplitude of said first non-zero amplitude corner element;

based on said 'run' value, selecting for said current block a specific one from a group of pre-defined different scan paths for the remaining elements in said current block.

In principle the inventive apparatus is suited for selecting a scan path for the elements of a block in a spatial domain picture encoder, said apparatus including means being adapted for determining in a current block, starting from a pre-defined corner element in said block, how many zero amplitude values of the corner elements said block contains when proceeding in clockwise direction, or as an alternative in counter-clockwise direction, and upon determining the first corner element having a non-zero amplitude, for forming a run-level value pair wherein the 'run' value corresponds to the number of preceding zero-amplitude corner elements in said current block and the 'level' value corresponds to the amplitude of said first non-zero amplitude corner element, said means being further adapted for selecting, based on said 'run' value, for said current block a specific one from a group of pre-defined different scan paths for the remaining elements in said current block.

In principle, the inventive method is suited for selecting a scan path for the elements of a block in spatial domain picture decoding, said method including the steps:

determining for a current block the 'run' value of a first run-level value pair in received scan select information, wherein at encoder side, starting from a pre-defined corner element in the corresponding block, it was determined how many zero amplitude values of the corner elements said block contains when proceeding in clockwise direction, or as an alternative in counter-clockwise direction, and upon determining the first corner element having a non-zero amplitude, a run-level value pair was formed wherein the 'run' value corresponds to the number of preceding zero-amplitude corner elements in said current block and the 'level' value corresponds to the amplitude of said first non-zero amplitude corner element;

based on said 'run' value, selecting for said current block a specific one from a group of pre-defined different scan paths for the remaining elements in said current block.

In principle the inventive apparatus is suited for selecting a scan path for the elements of a block in a spatial domain picture decoder, said apparatus including means being adapted for determining for a current block the 'run' value of a first run-level value pair in received scan select information (SCSI), wherein at encoder side, starting from a pre-defined corner element in the corresponding block, it was determined how many zero amplitude values of the corner elements said block contains when proceeding in clockwise direction, or as an alternative in counter-clockwise direction, and upon determining the first corner element having a non-zero amplitude, a run-level value pair was formed wherein the 'run' value corresponds to the number of preceding zero-amplitude corner elements in said current block and the 'level' value corresponds to the amplitude of said first non-zero amplitude corner element, said means being further adapted for selecting, based on said 'run' value, for said current block a specific one from a group of pre-defined different scan paths for the remaining elements in said current block.

Advantageous additional embodiments of the invention are disclosed in the respective dependent claims.

DRAWINGS

Figure 2:
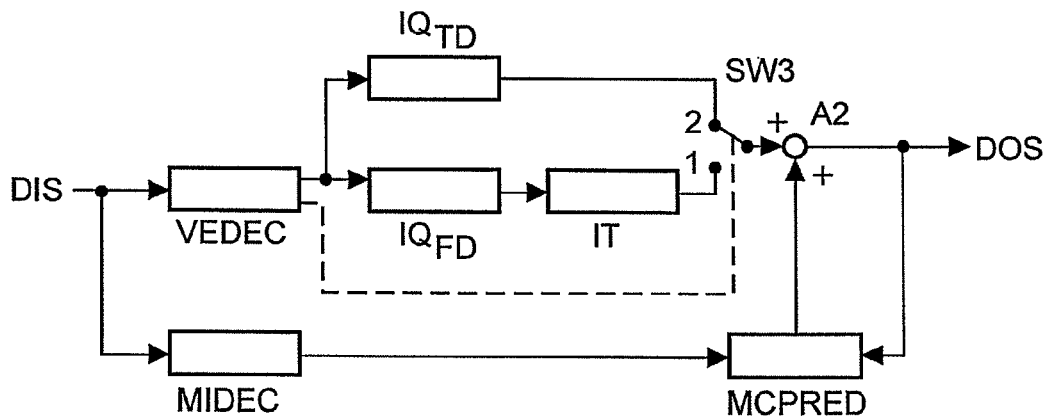

Exemplary embodiments of the invention are described with reference to the accompanying drawings, which show in:

FIG. 1 block diagram of an adaptive spatial domain/frequency domain video encoder;

FIG. 2 block diagram of an adaptive spatial domain/frequency domain video decoder;

FIG. 3 known example scan path for spatial domain prediction error values;

FIG. 4 example spatial domain prediction error values, before and after quantisation;

FIG. 5 further example spatial domain prediction error values, before and after quantisation;

FIG. 6 example picture content;

FIG. 7 step 1: inventive scan order forming the first (run, level) pair;

FIG. 8 scan order for run=0 in step 1 (zigzag scan);

FIG. 9 scan order for run=1 in step 1;

FIG. 10 scan order for run=2 in step 1;

FIG. 11 scan order for run=3 in step 1;

FIG. 12 scan order for run>3 for the first (run, level) pair.

EXEMPLARY EMBODIMENTS

An encoder block diagram similar like that in the above cited publications is shown in FIG. 1. The encoder video input signal EIS is fed block by block to a subtractor S and to a motion estimator step or stage ME. In the subtractor, a block of a motion compensated prediction signal MCPS is subtracted from signal EIS. The subtractor output signal passes through a time domain quantiser $Q_{TD}$ and an inverse time domain quantiser $IQ_{TD}$, and passes through a time-to-frequency domain transformer T, a frequency domain quantiser $Q_{FD}$, an inverse frequency domain quantiser $IQ_{FD}$, and an inverse transformer IT from frequency to time domain.

Either the output from inverse transformer IT or the output from inverse time domain quantiser $IQ_{TD}$ passes through a switch SW1 and an adder A to a motion compensated predictor step or stage MCP that outputs a predicted pixel block to the subtracting input of subtractor S, to the second input of adder A, and to the second input of motion estimator ME. Motion estimator ME calculates motion information for the current pixel or coefficient block to be encoded and controls motion compensated predictor MCP with this motion information. Motion information encoder step or stage MIENC entropy encodes this motion information and provides an encoded motion encoder output signal EMOS.

Either the output from frequency domain quantiser $Q_{FD}$ or the output from time domain quantiser $Q_{TD}$ passes through a switch SW2 to a video signal entropy encoder step or stage VEENC that output a correspondingly encoded video encoder output signal EVOS. In encoder VEENC the below described inventive scanning processing is carried out. Corresponding scan select information SCSI is also provided.

In the spatial domain block encoding process, transform and inverse transform are omitted, and the quantised prediction error values are scanned and entropy-coded. The step of scanning can be regarded as a part of the entropy encoding process. Signals EVOS, SCSI and EMOS may be combined into a bit stream that is transmitted to a corresponding decoder, or that may be stored or recorded on a storage medium.

In FIG. 2 a decoder input signal DIS, e.g. the above-mentioned bit stream, is fed to video signal entropy decoder step or stage VEDEC and to a motion information decoder step or stage MIDEC. In VEDEC the video information is entropy decoded and the output signal is fed to a corresponding inverse time domain quantiser $IQ_{TD}$ and passes through a corresponding inverse frequency domain quantiser $IQ_{FD}$ and a corresponding inverse transformer IT. Either the output from inverse frequency-to-time domain transformer IT or the output from inverse time domain quantiser $IQ_{TD}$ passes through a switch SW3 to an adder A2 that outputs the correspondingly decoded decoder output signal DOS. Switch SW3 is controlled by the received scan select information SCSI. The encoded motion information is entropy decoded in a motion information decoder step or stage MIDEC and is fed to a motion compensated predictor step or stage MCPRED. MCPRED also receives the decoder output signal DOS. The predicted block is added in adder A2 to the output signal of switch SW3.

FIG. 4 shows an example block spatial domain prediction error values, at the left side before and at the right side following quantisation. FIG. 5 shows corresponding pictures for other example prediction error values.

Before describing the inventive scanning processing, some statistical results and the rationale of the invention are explained. Experiment have shown that, when spatial domain video coding is selected rather than frequency domain video coding, the prediction error in spatial domain usually has the following characteristics:
a) The prediction errors having greater absolute values are usually located near the boundaries of a block and are clustered in a corner of the block.
b) Only a few, e.g. less than four, prediction error values have a significantly greater absolute value than most of the other prediction error values of the block.

In other words, the prediction error value energies are concentrated not only in their positions but also in their values. In such specific cases, spatial domain video coding is better than the widely-used frequency domain video coding because the energy of the prediction error values is already concentrated in the spatial domain. If transform into the frequency would be used instead, the energy would be scattered in the frequency domain block, which characteristic does not fit for optimum entropy coding.

These specific cases usually occur at complex edges or at some complex moving object in the picture content where block-based intra or inter prediction can not provide a perfect prediction for all pixels of a current block, but a perfect prediction of the mean value of the whole block.

For example in the block depicted in FIG. 6, the black region indicates a corner of an appeared object which can not be predicted well, while all the other pixels can be predicted perfectly. Accordingly, in this corner greater prediction error values are contained than in most of the other prediction sample positions of the block, and hence spatial domain video coding is preferable. In natural images or videos, the big prediction error values usually occur in the corner or at the borders because the size of an object is larger than the coding block size.

According to the invention, in a first step or stage, the matrix elements in the corners of a time domain block are scanned in order to determine in which one of the corners the prediction error values are clustered, and the related information is encoded. Based on the result of this first step, the spatial domain video coding adaptively selects a suitable scan order to entropy encode the rest of the prediction error values.

The following shows a detailed embodiment for encoding a block including at least one non-zero quantised prediction error value.

Step 1:
In the quantised prediction error values in the corners of the current block, as shown in FIG. 7, the scanned samples are formed into a (run, level) pair. The value 'run' means the number of zero-amplitude sample values (in the corner positions of the block, starting clockwise in the upper left corner) before the non-zero amplitude sample value 'level', like the run-level coding in existing video coding standards.

Only the first (run, level) pair is concerned in this step, that is, if more than one of the four positions '0', '1', '2' and '3' in FIG. 7 has non-zero quantised samples, then the samples except the first non-zero sample are left to be encoded in step 2. For example, in step 1, the case in FIG. 3 forms the (run, level) pair (2, 3), the case in FIG. 4 forms the (run, level) pair (1, −2), and the case in FIG. 5 forms the (run, level) pair (3, 3).

In case all four quantised samples in the four corners are zeros, then go directly to step 2.

Step 2:
According to the result of step 1, adaptively select the scan mode for the remaining quantised samples. For selection there are defined only e.g. five fixed scan tables.

If 'run' equals zero in step 1, which means (corner) position 0 (upper left corner) in FIG. 7 has a non-zero quantised prediction error, then the scan path (from position '1' to position '15' in the current block) for the rest of the quantisation errors is defined in FIG. 8.

If 'run' equals '1' in step 1, which means corner position '1' (upper right corner) in FIG. 7 has a non-zero quantised prediction error, then the scan path (from position '2' to position '15' in the current block) for the rest of the quantisation errors is defined in FIG. 9.

The case in FIG. 4 will use this scan path since its first 'run' equals '1'. Thus all the (run, level) pairs of FIG. 4 are (1, −2), (0, −1), which will generate a significantly smaller number of run values and hence fewer bits to be encoded.

If 'run' equals '2' in step 1, which means corner position '2' (bottom-right corner) in FIG. 7 has a non-zero quantised prediction error, then the scan path (from position '3' to position '15' in the current block) for the rest of the quantisation errors is defined in FIG. 10.

The case in FIG. 3 will use this scan path since its first 'run' equals '2'. Thus all the (run, level) pairs of FIG. 3 are (2, 3), (1, 1), (3, −1), which will generate a significantly smaller number of run values and hence fewer bits to be encoded.

If 'run' equals '3' in step 1, which means corner position '3' (bottom-left corner) in FIG. 7 has a non-zero quantised prediction error, then the scan path (from position '4' to position '15' in the current block) for the rest of the quantisation errors is defined in FIG. 11.

The case in FIG. 5 will use this scan path since its first 'run' equals '3'. Thus all the (run, level) pairs of FIG. 5 are (3, 3), (1, 2), (1, −1), which will generate a significantly smaller number of run values and hence fewer bits to be encoded.

The selected pre-defined scan path may contain a section representing zigzag scanning with respect to the corner represented by the 'run' value.

If all four corner positions '0', '1', '2' and '3' have zero amplitude values, then the scan path is defined like in FIG. 12, i.e. following scan of the four block corners, the scan path continues in the middle region of the block, i.e. a scan path different from the other pre-defined scan paths is selected.

When an inventive decoder receives a series of (run, level) pairs for a current block, it will first decode the first (run, level) pair and thereafter, according to the value of the first 'run' value, select a corresponding one of the group of encoder pre-defined scan path tables. After the decoder has finished decoding all the received (run, level) pairs for the current block, it assigns the level values to the correct block positions, based on the selected scan path table.

The scan path tables in FIG. 7 to 12 are examples from statistical experimental results. In practice, the fixed scan path tables can be pre-defined in video coding standards for both encoder and decoder.

In the first step, instead of assigning run=0 to the upper left corner of the block, run=0 can also be assigned to another corner in the block. In the first step, instead of increasing the 'corner' run value clockwise, the corner run value can increase counter-clockwise.

The adaptive process can be extended by using more than the two steps described in the embodiments, whereby the second step (and may be further steps) again defines, based on run and/or level values in the beginning of the initially selected scan path, for the following scan path section which one to select from a group of pre-defined scan paths.

The invention claimed is:

1. A method for selecting in a picture encoding apparatus a scan path for the elements of a block in spatial domain picture encoding, said method comprising the steps: determining in said picture encoding apparatus in a current block, starting from a pre-defined corner element in said block, how many zero amplitude values of the corner elements said block contains when proceeding in clockwise direction, or as an alternative in counter-clockwise direction, and upon determining the first corner element having a non-zero amplitude, forming a run-level value pair wherein the 'run' value corresponds to the number of preceding zero-amplitude corner elements in said current block and the 'level' value corresponds to the amplitude of said first non-zero amplitude corner element; based on said 'run' value, selecting in said picture encoding apparatus for said current block a specific one from a group of pre-defined different scan paths for the remaining elements in said current block.

2. A method for selecting in a picture decoding apparatus a scan path for the elements of a block in spatial domain picture decoding, said method comprising the steps: determining in said picture decoding apparatus for a current block the 'run' value of a first run-level value pair in received scan select information, wherein at encoder side, starting from a pre-defined corner element in the corresponding block, it was determined how many zero amplitude values of the corner elements said block contains when proceeding in clockwise direction, or as an alternative in counter-clockwise direction, and upon determining the first corner element having a non-zero amplitude, a run-level value pair was formed wherein the 'run' value corresponds to the number of preceding zero-amplitude corner elements in said current block and the 'level' value corresponds to the amplitude of said first non-zero amplitude corner element; based on said 'run' value, selecting in said picture decoding apparatus for said current block a specific one from a group of pre-defined different scan paths for the remaining elements in said current block.

3. The method according to claim 1, wherein a scan path different from the scan paths associated with the four block corners is selected in case all four corner elements have zero amplitude values.

4. The method according to claim 1, wherein upon selection of a pre-defined scan path corresponding further run-level value pairs for said current block are formed.

5. The method according to claim 1, wherein the values of the elements in said current block are quantized residual values for a prediction of said current block.

6. The method according to claim 1, wherein said selected pre-defined scan path contains a section representing zigzag scanning with respect to the corner represented by said 'run' value.

7. The method according to claim 1, wherein in said encoding/encoder or decoding/decoder, respectively, it is adaptively switched between spatial domain and frequency domain processing for said current block wherein in case of frequency domain processing said adaptive scan path selection is not used.

8. An apparatus for selecting a scan path for the elements of a block in a spatial domain picture encoder, said apparatus comprising: means being adapted for determining in a current block, starting from a pre-defined corner element in said block, how many zero amplitude values of the corner elements said block contains when proceeding in clockwise direction, or as an alternative in counter-clockwise direction, and upon determining the first corner element having a non-zero amplitude, for forming a run-level value pair wherein the 'run' value corresponds to the number of preceding zero-amplitude corner elements in said current block and the 'level' value corresponds to the amplitude of said first non-zero amplitude corner element, said means being further adapted for selecting, based on said 'run' value, for said current block a specific one from a group of pre-defined different scan paths for the remaining elements in said current block.

9. An apparatus for selecting a scan path for the elements of a block in a spatial domain picture decoder, said apparatus comprising: means being adapted for determining for a current block the 'run' value of a first run-level value pair in received scan select information, wherein at encoder side, starting from a pre-defined corner element in the corresponding block, it was determined how many zero amplitude values of the corner elements said block contains when proceeding in clockwise direction, or as an alternative in counter-clockwise direction, and upon determining the first corner element having a non-zero amplitude, a run-level value pair was formed wherein the 'run' value corresponds to the number of preceding zero-amplitude corner elements in said current block and the 'level' value corresponds to the amplitude of said first non-zero amplitude corner element, said means being further adapted for selecting, based on said 'run' value, for said current block a specific one from a group of pre-defined different scan paths for the remaining elements in said current block.

10. The apparatus according to claim 8, wherein a scan path different from the scan paths associated with the four block corners is selected in case all four corner elements have zero amplitude values.

11. The apparatus according to claim 8, wherein upon selection of a pre-defined scan path corresponding further run-level value pairs for said current block are formed.

12. The apparatus according to claim 8, wherein the values of the elements in said current block are quantized residual values for a prediction of said current block.

13. The apparatus according to claim 8, wherein said selected pre-defined scan path contains a section representing zigzag scanning with respect to the corner represented by said 'run' value.

14. The apparatus according to claim 8, wherein in said encoding/encoder or decoding/decoder, respectively, it is adaptively switched between spatial domain and frequency domain processing for said current block wherein in case of frequency domain processing said adaptive scan path selection is not used.

15. A non-transitory storage media that stores a computer program code which, when the computer code is executed, causes a computer to carry out the steps of claim 1.

* * * * *